United States Patent Office 3,441,628
Patented Apr. 29, 1969

3,441,628
PROCESS FOR PRODUCING WAXLIKE LOW MOLECULAR ETHYLENE POLYMERS AND COPOLYMERS
Manfred Rätzsch and Horst Grundmann, Leuna, and Rolf Kilian, Bad Durrenberg, Germany, assignors to VEB Leuna-Werke Walter Ulbricht, Leuna, Germany
No Drawing. Filed Dec. 13, 1965, Ser. No. 513,540
Int. Cl. C07c 3/40
U.S. Cl. 260—683
8 Claims

ABSTRACT OF THE DISCLOSURE

A process for producing waxlike low molecular weight substantially linear ethylene polymers and copolymers by thermal degradation of plastic-like high molecular weight ethylene polymers and copolymers in the absence of air or oxygen, which comprises introducing plastic-like high molecular weight ethylene polymers and copolymers into a prepared melt of partly degraded ethylene polymers or copolymers at temperatures between 300 and 600° C. preferably between 360 and 420° C. for a dwell time from 30 seconds to 5 hours, preferably 2 to 5 minutes.

---

The present invention relates to waxlike low-molecular ethylene polymers and ethylene copolymers. The polymers here concerned are primarily linear ethylene polymers and copolymers made by thermal degradation of high-molecular plastic ethylene polymers whereby the starting materials are admixed in a manner known per se, with radical-forming agents or agents controlling the molecular weight.

It is known to polymerize ethylene to high-molecular plastics or to make plastics from copolymers of ethylene and vinyl acetate, vinyl ethers and other alkenes or dienes. Plastics made in this manner may be worked up into foils, tubes, cable insulations and articles made by injection molding.

Such high molecular plastics however are not useful as polishing agents, additives to rubber or to paraffins, for the production of floorwax, for leather treatment agents, protectives against corrosion, self-polishing emulsions, textile sizings, preserving agents and the like. For these purposes it is conventional to use waxlike, low molecular ethylene polymers and copolymers with alkenes.

It is known to produce such polymers by the direct polymerization of the starting material with addition of chain transfer agents, such as propane, butane, and the like or with the addition of hydrogen.

With the use of chain transfer agents, branched, soft polymers are mostly obtained which contain a high amount of oil. Such products are not useful as polishing agents, self-polishing agents, floorwaxes, printing inks and the like, because they do not produce any gloss and are of insufficient hardness. Even when paraffin is added, the shortcomings cannot be overcome.

For improving the products so that they may be used for the purposes just mentioned, an addition of 10 to 15 vol. percent hyydrogen at temperatures ranging from 150°–180° C. at pressures of 300–500 atms. with the use of di-tert.-butylperoxide as catalyst, if necessary in the presence of benzene may be used to obtain waxlike low molecular polyethylene with a melting range of 106°–109° C., a melt viscosity at 120° C. of 400 to 2000 cst. with a crystalline component of 60 to 65%. It is true, that it is possible to arrive at soft as well as medium hard, low molecular polymers by direct polymerization. But it is not possible to obtain in this manner waxlike products with a uniform molecular weight, such as they are used for special polishing agents, temperature-resistant anti-corrosives and coating-waxes for the paper industry.

It is further known to make low molecular waxlike polyethylene from high molecular polyethylene by degradation. For instance, such degradation may be carried out in vacuo or pressure vessels by heating the starting material to a temperature above 290° C. for a certain time in the absence of air or other oxidants, while stirring.

Another known process consists in conducting high molecular polyethylene at a temperature of 100° to 300° C. and a pressure of 140 to 420 atm. through a tube of small diameter whereby thermal degradation occurs. All the processes in which waxlike, low molecular polyethylenes are obtained by thermal degradation have the drawback that the degradation is incomplete due to the low heat conductivity of the polyethylene used and of the waxlike products formed, or that overheating will set in at certain points whereby the production of products of uniform molecular weight will be prevented.

One method to overcome the above mentioned drawbacks is to carry out the thermal degradation in suitable heat resistant solvents. When low boiling solvents, such as hexane are used, it is of course necessary to carry out the reaction under pressure in order to avoid evaporation of the solvent. Therefore, higher boiling solvents are preferably used for thermal degradation such as liquid paraffin. They incur, however, a difficulty in the subsequent removal of the solvent, due to the chemical similarity between the paraffin and the degradation products, and considerable expenses are thereby required. It is the object of the present invention to overcome the above-mentioned drawbacks.

It is a further object of the invention to provide a method of making wax like low molecular, primarily linear ethylene polymers and copolymers in a simple manner by thermal degradation of plastic-like high molecular, partly branched ethylene polymers and copolymers in an atmosphere which is free of air and oxidizing substances.

This object will be achieved according to the invention by performing the degradation of ethylene polymers by a thermal treatment in a melt of already degraded ethylene polymers, or copolymers at a temperature of 300° C. to 600° C., preferably 360° C. to 420° C., and dwell times of 30 seconds to 5 hours.

The thermal treatment should be performed in an agitator or in an agitator in combination with a drain pipe. Thereby, radical-forming agents or molecular weight control-agents, respectively, may be added to the initial product in a known manner, before or during the degradation process.

Tests have revealed that the thermal degradation depends on the temperature and dwell time. However, when a constant temperature is maintained, the degradation curve comes to a break for a certain time period, so that it is possible to perform the degradation of high molecular polymers in a hot melt. For instance, a waxlike low molecular polymer may be brought to a desired temperature in an agitator which is provided with an electric heating device. The plastic-like high molecular polymer which is to be degraded is introduced as granulate or in powder form, into the intensely agitated melt, and is instantly melted. The speed of degradation can be controlled by means of the temperature or dwell time, respectively. The agitator should be provided with a drain pipe, which should have the same temperature as the agitator through which pipe the degraded waxlike, low molecular polymer is drained off, after the required dwell time.

The method can also be performed in a manner in which a mixture of high and low molecular polymers is made at room temperature, said mixture being melted and brought to the desired temperature. Furthermore, it is also possible to introduce the ethylene polymer to be degraded, into the melt of low molecular polymers, which are below a degradation temperature, and subsequently heating of both components to degradation temperature. It is also possible to introduce the high molecular polymer in a molten condition into the melt of the low molecular polymers, which are either at a degradation temperature, or which are heated to this temperature, after adding the high polymer.

The method may be performed continuously or discontinuously. The gaseous or volatile products, which form during the degradation process, may be exhausted from the agitator. Due to the possibility of maintaining an accurate temperature and dwell time control, end products having a uniform molecular structure will be obtained, so that a separation of products having an undesirable molecular weight, or a purification will not be required.

As mentioned before, it may be advantageous to add radical-forming agents or molecular weight control agents before or during the degradation process. Radical-forming agents are for instance: oxygen, peroxides, e.g. lauroyl peroxide, benzoyl peroxide, di-tert.-butyl peroxide, and tert.-butyl-perbenzoate, as well as azo-compounds, e.g. $\alpha,\alpha'$-azo-bisbutyro-nitrile. Molecular weight control agents are e.g. the following: propane, higher paraffins, hydrogen, and cyclohexane.

The method is especially adapted for making waxes from inferior plastic material which is no longer useful in making plastics.

In the following examples, the melting indexes were defined by the ASTM-method, test No. D–1238–52–T, the viscosities by the "Hoeppler" method.

EXAMPLE 1

In to an electrically heated agitator vessel having a capacity of 1 m.$^3$, we introduce 500 kilograms of polyethylene wax having a melting range of 95 to 102° C., a hardness of 310 kp./cm.$^2$, a viscosity of 100 cp. at 140° C. and a molecular weight of 2200. The temperature is maintained at 365° C. As a protecting atmosphere, we use nitrogen. In the lower part of the agitator there is a mass of molten wax covering a tubular coil 5 meters in length, having a diameter of 50 millimeters, through which the product is discharged from the vessel over a shut off member, for passage to a filling and granulating device.

By means of a dosing device we introduce continuously into the agitator 150 kilograms per hour of polyethylene granules having a melting index of 2.5 gram/10 minutes (ASTM method). Through the coil we discharge continuously 150 kilograms of polyethylene wax. The dwell time of the product in the coil is two minutes. The volatile components which form during the degradation are sucked off from the agitator.

The polyethylene wax obtained is colorless and free of odor and has the following characteristics:

Melting range 95 to 100° C., hardness 315 kp./cm.$^2$, viscosity at 140° C. equals 108 cp.

The polyethylene wax so produced is particularly useful for floor wax and for printing inks, as well as for use in the textile industry; this is due to great hardness, and a superior gloss combined with a uniform quality.

EXAMPLE 2

In the agitator described in Example 1, 500 kilograms polyethylene vinyl-acetate wax having a softening point of 110° C., a viscosity of 160 cp. at 140° C. and a molecular weight of 3,000 are melted in a nitrogen atmosphere and then heated to 380° C. Subsequently, 175 kilograms polyethylene vinylacetate copolymer are added hourly with stirring to the melt, which has a melting index of three grams/10 minutes (ASTM method) and a vinylacetate content of 28 weight percent. Through the tubular coil we discharge hourly 175 kilograms polyethylene vinyl acetate with a dwell time of 115 seconds, said discharge being continuous; after cooling the product is subjected to granulation. The products are distinguished by their extreme clarity, high flexibility up to minus 30° C. and their impermeability for steam. They may be used for impregnating cardboard and paper.

EXAMPLE 3

In the agitator described in Example 1, 500 kilograms polyethylene having a melting range of 109° to 117° C., a hardness of 465 kp./cm.$^2$, a viscosity of 145 cp. at 140° C. and a molecular weight of 2,500, are melted and heated to a temperature of 350° C.

While stirring we add continuously 100 kilograms polyethylene per hour, which has a melting index of 8.3 gram/10 minutes (ASTM method) into which were incorporated 0.5 percent dicumyl peroxide as initiator at a temperature of 150° C. A continuous discharge per hour of 100 kilograms polyethylene wax with a dwell time of five minutes in the tubular coil will take place, which will thereafter be granulated.

Obtained in a colorless, odorless, brittle polyethylene wax with a crystallinity of 97%. The melting range lies between 113 and 117° C., the viscosity is 140 cp. at 140° C. The hardness of the wax is 455 kp. per cm.$^2$. This product is useful for the production of high rating self-polishing emulsions which provide a permanent gloss and a high scuff-resistance.

EXAMPLE 4

In the agitator described in Example 1, 500 kilograms polyethylene wax having a melting range of 65 to 73° C., and a viscosity of 84 cp. at 140° C., are melted in an atmosphere of nitrogen and heated to a temperature of 410° C. To this melt, we add continuously 150 kilograms polyethylene granulate having a melting index of 3 grams/10 minutes (ASTM method). Through the tubular coil the same amount is discharged after a dwell time of two minutes, then cooled and filled into barrels.

The so obtained product is colorless to slightly yellow and has a slightly sticky consistency. It has almost the same characteristics as the wax which is used for the start and it is particularly useful as an addition to protective creams against radiation and as a lubricant in the rubber and thin polyethylene foil making industries.

EXAMPLE 5

In the agitator as described in Example 1, 500 kilograms ethylene copolymer with carbon monoxide, having a melting range of 95 to 105° C., a hardness of 290 kp./cm.$^2$, a viscosity of 100 cp. at 140° C., a molecular weight of 2,100 and a content of 5% carbon monoxide copolymerized under a nitrogen atmosphere, are melted and heated to a temperature of 380° C. Subsequently, we have added 80 kilograms ethylene-carbon monoxide copolymer with an average molecular weight of 20,000 while stirring constantly during one hour. Also, as a stabilizer di-tert.-butyl-p-cresol in the amount of 0.7% had been added. Through the tubular coil we withdraw continuously a colorless copolymer at 80 kilograms per hour having a crystallinity of 94.5%, a hardness of 215 kp. per cm.$^2$, a viscosity of 115 cp. at 140° C. and a melting range of 96 to 107° C.

This type of wax may be emulsified without after-treatment and is characterized by excellent gloss when a film is formed, also by stream impermeability and scuff-resistance. The wax can be used preferably for preparation of leather and as a floor wax.

EXAMPLE 6

In an electrically heated agitator having a capacity of 1 m.$^3$ we introduce 400 kilograms polyethylene wax according to Example 1, at a temperature of 250° C. and melt the same. As a protective gas argon is used. Into the melt, we introduce while stirring 350 kilograms high pressure polyethylene granulate having a melting index of 2.3 grams per ten minutes (ASTM method) the introduction being carried out in a short time; the temperature is maintained at all times above 230° C. The viscous mixture formed is heated with stirring to 380° C. and this temperature is maintained for four hours. During the degradation one may observe clearly a decrease in viscosity. Subsequently, the liquid wax is withdrawn within three hours, cooled and comminuted.

The product so obtained has a melting range of 90 to 97° C., a hardness of 240 kilograms/cm.$^2$ and a viscosity of 95 cp. at 140° C. It is very well suited to be compounded with paraffin and to be used as cable wax.

When making several batches, it is advisable to withdraw each time only 350 kilograms of the wax and to add to the remaining wax in the agitator further amounts of polyethylene to be melted.

EXAMPLE 7

In the agitator mentioned in Example 6, a mixture of 400 kilograms of solid polyethylene wax in accordance with Example 1 and 350 grams polyethylene having a melting index of 8.3/10 minutes (ASTM method) are introduced at room temperature in an argon atmosphere and are heated to a temperature of 385° C., at which they are maintained. After melting sets in the mixture is stirred. The degradation is completed after stirring for three and one half hours.

The wax obtained is withdrawn, cooled and comminuted. It has the characteristics of the end product mentioned in Example 6.

EXAMPLE 8

The procedure is about the same as in Example 6. Instead of polyethylene granulate, a polyethylene which is already molten is added to the wax melt at 250° C. by an extruding device. The time within which the addition occurs may be a little shorter than in Example 6 since the amount of heat, which would be needed to melt the granulate, is not necessary in this case. The end products have the same characteristics as described in Example 6.

EXAMPLE 9

In an electrically heated agitator having a capacity of 1 m.$^3$, 500 kilograms polyethylene wax as in Example 1 are introduced, melted and heated to a temperature of 365° C. while being stirred. At the bottom of the container a tube which is heatable from the outside and which is five meters long and has a diameter of 50 millimeters is arranged which serves for withdrawal of wax. In accordance with Example 1, 150 kilograms polyethylene granulate are added to the melt per hour, said granulate having a melting index of 8.3 grams per 10 minutes (ASTM method). The tube is heated to 365° C. and through it 150 kilograms polyethylene wax are withdrawn per hour the dwell time being two minutes.

The so obtained wax has the same properties as the one described in Example 1.

Although the invention has been described with reference to several specific embodiments thereof, it is, however, not intended that the invention should be limited to such specific embodiments, but rather defined by the scope of the appended claims.

What is claimed is:

1. A process for producing waxlike low molecular weight substantially linear ethylene polymers and co-polymers by thermal degradation of plastic-like high molecular weight ethylene polymers and co-polymers in the absence of air or oxygen, which comprises introducing plastic-like high molecular weight ethylene polymers and co-polymers into a prepared melt of waxlike low molecular weight partly degraded ethylene polymers or co-polymers at temperatures between 300 and 600° C. and treating them for dwell times from 30 seconds to 5 hours, with intense stirring, the quantity of polymers or co-polymers being treated at a given instant being such that in the absence of said intense stirring substantial non-uniformities in temperature within said quantity would occur and the weight proportion of the waxlike low molecular weight partly degraded polymers or co-polymers being greater than the weight proportion of said plastic-like high molecular weight polymers or co-polymers.

2. The process according to claim 1, wherein the ethylene polymers undergoing degradation are partly branched polymers.

3. The process according to claim 1, wherein the temperature of the heat treatment is maintained between 360 and 420° C.

4. The process according to claim 1, wherein the process is carried out in a stirring zone combined with a withdrawal zone wherein the degraded product is made to remain for a certain dwell time before discharge.

5. The process according to claim 1, wherein the dwell time is 2–5 minutes.

6. The process according to claim 1, wherein high molecular weight polyethylene to be degraded is introduced in granular or powder form into a melt of polyethylene which is being intensely stirred.

7. The process according to claim 1, wherein a mixture of high molecular and low molecular weight polyethylene is first formed at room temperature whereupon the mixture is melted and then subjected to heat treatment at 300–600° C.

8. The process according to claim 7, wherein the heat treatment is carried out under an atmosphere of an inert gas.

References Cited

Oakes et al.: The Thermal Degradation of Ethylene Polymers, Chemical Society Journal, pages 2929–2935 relied on, 1949.

DELBERT E. GANTZ, *Primary Examiner.*

C. P. SPRESSER, *Assistant Examiner.*